United States Patent
Lee et al.

(10) Patent No.: US 12,287,407 B2
(45) Date of Patent: Apr. 29, 2025

(54) APPARATUS AND METHOD FOR IMPROVING POSITION ACCURACY OF LIDAR MOTOR

(71) Applicants: Hyundai Motor Company, Seoul (KR); Kia Corporation, Seoul (KR)

(72) Inventors: Eun Sang Lee, Seongnam-Si (KR); Yong Sung Lee, Seongnam-Si (KR); Sang Gyu Park, Suwon-Si (KR); Woo Ii Lee, Uiwang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 843 days.

(21) Appl. No.: 17/521,590

(22) Filed: Nov. 8, 2021

(65) Prior Publication Data

US 2022/0268937 A1  Aug. 25, 2022

(30) Foreign Application Priority Data

Feb. 19, 2021 (KR) .................... 10-2021-0022812

(51) Int. Cl.
*G01S 17/42* (2006.01)
*G01S 7/481* (2006.01)
*G01S 17/88* (2006.01)
*H02P 6/16* (2016.01)
*H02P 31/00* (2006.01)

(52) U.S. Cl.
CPC ............ *G01S 17/88* (2013.01); *G01S 7/4817* (2013.01); *H02P 6/16* (2013.01); *H02P 31/00* (2013.01)

(58) Field of Classification Search
CPC ........ G01S 17/42; G01S 17/88; G01S 7/4817; G07C 9/00174; G08G 1/096861; H02P 6/16; H02P 31/00
See application file for complete search history.

(56) References Cited

U.S. PATENT DOCUMENTS

| 8,767,190 B2 | 7/2014 | Hall |
| 9,964,758 B2 | 5/2018 | Bayha et al. |
| 2021/0118295 A1* | 4/2021 | Visintainer ...... G08G 1/096861 |
| 2021/0336566 A1* | 10/2021 | Long ...................... G01S 17/42 |

FOREIGN PATENT DOCUMENTS

| CN | 103259089 A | 8/2013 |
| JP | 2016-099164 A | 5/2016 |

* cited by examiner

*Primary Examiner* — Cortez M Cook
(74) *Attorney, Agent, or Firm* — Morgan, Lewis & Bockius LLP

(57) ABSTRACT

An apparatus of improving position accuracy of a Light Detection and Ranging (LIDAR) motor may include a motor that rotates at a rotation speed set by a user and a controller that generates a parameter depending on the rotation speed for determining a position of the motor within a preset horizontal angle of view and determines whether the motor is in a normal operation state and the position of the motor, based on the parameter.

20 Claims, 13 Drawing Sheets

| FRAME RATE [Hz] | SPEED [RPM] | ROTATION TIME PER ONE REVOLUTION [s] | HORIZONTAL ANGLE OF VIEW [°] | HORIZONTAL ANGULAR RESOLUTION [°] | CONVERSION OF HORIZONTAL ANGULAR RESOLUTION INTO TIME [s] | ENCODER OUTPUT / PULSE ANGLE PER 1 CYCLE [°] | ENCODER OUTPUT / PULSE ANGLE TIME PER 1 CYCLE [s] |
|---|---|---|---|---|---|---|---|
| 25 | 1500 | 0.04 | 120 | 0.23 | 13us | 0.352 | 39.1us |
| 20 | 1200 | 0.05 | | 0.17 | 12.2us | | 48.8us |
| 15 | 900 | 0.067 | | 0.14 | 13us | | 65.1us |
| 10 | 600 | 0.1 | | 0.11 | 16.3us | | 97.7us |
| 5 | 500 | 0.2 | | 0.1 | 27.9us | | 195.5us |

Fig.4

| FRAME RATE [Hz] | SPEED [RPM] | ROTATION TIME PER ONE REVOLUTION [s] | HORIZONTAL ANGLE OF VIEW [°] | CONVERSION OF HORIZONTAL ANGULAR RESOLUTION INTO TIME [s] | ENCODER OUTPUT / PULSE ANGLE PER 1 CYCLE [°] | ENCODER OUTPUT / PULSE ANGLE TIME PER 1 CYCLE [s] | N |
|---|---|---|---|---|---|---|---|
| 25 | 1500 | 0.04 | 0.23 | 13us | 0.352 | 39.1us | 3 |
| 20 | 1200 | 0.05 | 0.17 | 12.2us | | 48.8us | 4 |
| 15 | 900 | 0.067 | 0.14 | 13us | | 65.1us | 5 |
| 10 | 600 | 0.1 | 0.11 | 16.3us | | 97.7us | 6 |
| 5 | 500 | 0.2 | 0.1 | 27.9us | | 195.5us | 7 |

Fig.8

APPARATUS AND METHOD FOR IMPROVING POSITION ACCURACY OF LIDAR MOTOR

CROSS-REFERENCE TO RELATED APPLICATION

The present application claims priority to Korean Patent Application No. 10-2021-0022812, filed on Feb. 19, 2021, the entire contents of which is incorporated herein for all purposes by this reference.

BACKGROUND OF THE INVENTION

Field of the Invention

The present invention relates to an apparatus and method for improving position accuracy of a Light Detection and Ranging (LiDAR) motor.

Description of Related Art

A LIDAR may include a mirror capable of emitting and receiving a laser by reflecting the laser. The mirror, while being rotated by a motor, may emit a laser for each horizontal angle of view and may scan a signal of light reflected from a target object, and the LIDAR may measure the distance to the target object accordingly. The LIDAR may further include a rotary encoder that detects rotational displacement depending on rotation of the motor. The horizontal angle of view may include 360 degrees, or may include a portion (e.g., 120 degrees or 140 degrees) of 360 degrees. A. A horizontal angular resolution may be defined by subdividing the horizontal angle of view.

To enable the LIDAR to emit and receive a laser at an accurate point of the horizontal angular resolution, the position of the motor has to be accurately determined. However, because the motor is difficult to drive at complete constant speed and causes an error while rotating, the position of the motor may be difficult to accurately determine, and therefore, the accuracy in detecting the target object may deteriorate.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a LIDAR motor position accuracy improvement apparatus and method for improving detection accuracy of a target object by accurately determining the position of a motor of a LIDAR.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus configured for improving position accuracy of a LIDAR motor includes a motor that rotates at a rotation speed set by a user and a controller that generates a parameter depending on the rotation speed for determining a position of the motor within a preset horizontal angle of view and determines whether the motor is in a normal operation state and the position of the motor, based on the parameter.

The apparatus may further include an encoder that outputs a pulse waveform depending on the rotation of the motor with respect to a predetermined position of the motor.

The controller may be configured to generate the parameter by obtaining a horizontal angular resolution previously defined depending on the rotation speed, converting the horizontal angular resolution into time based on the rotation speed, determining rotation time per one revolution of the motor depending on the rotation speed, and determining a rotation angle of the motor per one cycle of a pulse waveform and rotation time of the motor per one cycle of the pulse waveform, based on a number of cycles of the pulse waveform output per one revolution of the motor depending on the rotation speed.

The controller may be configured to determine whether the motor is in the normal operation state, by setting an allowable error range of the rotation speed, re-determining a rotation time range of the motor per one cycle of the pulse waveform within the allowable error range, and counting clock signals of a preset processing speed within the re-determined rotation time range.

The controller may divide the rotation angle of the motor per one cycle of the pulse waveform by N value and may determine the position of the motor at each of points obtained by dividing the rotation angle of the motor per one cycle of the pulse waveform by the N value.

The controller may set the N value depending on the rotation speed.

The controller may start to count the clock signals of the preset processing speed from a rising edge point of the pulse waveform, may determine a total clock-signal count at each of the points obtained by dividing the rotation angle of the motor per one cycle of the pulse waveform by the N value, and may determine whether the motor rotates to the point, based on the total clock-signal count determined at the point.

The controller may compensate for an error in the position of the motor by initializing the total clock-signal count at the rising edge point of the pulse waveform, when the error in the position of the motor occurs due to the allowable error range of the rotation speed.

According to various aspects of the present invention, a method for improving position accuracy of a LIDAR motor includes rotating a motor at a rotation speed set by a user, generating a parameter depending on the rotation speed for determining a position of the motor within a preset horizontal angle of view, determining whether the motor is in a normal operation state, based on the parameter, and determining the position of the motor, based on the parameter.

An encoder may output a pulse waveform depending on the rotation of the motor with respect to a predetermined position of the motor.

The generating of the parameter may include generating the parameter by obtaining a horizontal angular resolution previously defined depending on the rotation speed, converting the horizontal angular resolution into time based on the rotation speed, determining rotation time per one revolution of the motor depending on the rotation speed, and determining a rotation angle of the motor per one cycle of a pulse waveform and rotation time of the motor per one cycle of the pulse waveform, based on a number of cycles of the pulse waveform output per one revolution of the motor depending on the rotation speed.

The determining of whether the motor is in the normal operation state may include determining whether the motor is in the normal operation state, by setting an allowable error range of the rotation speed, re-determining a rotation time range of the motor per one cycle of the pulse waveform within the allowable error range, and counting clock signals of a preset processing speed within the re-determined rotation time range.

The determining of the position of the motor may include dividing the rotation angle of the motor per one cycle of the pulse waveform by N value and determining the position of the motor at each of points obtained by dividing the rotation angle of the motor per one cycle of the pulse waveform by the N value.

The N may be set depending on the rotation speed.

The determining of the position of the motor may include starting to count the clock signals of the preset processing speed from a rising edge point of the pulse waveform, determining a total clock-signal count at each of the points obtained by dividing the rotation angle of the motor per one cycle of the pulse waveform by the N value, and determining whether the motor rotates to the point, based on the total clock-signal count determined at the point.

The method may further include compensating for an error in the position of the motor by initializing the total clock-signal count at the rising edge point of the pulse waveform, when the error in the position of the motor occurs due to the allowable error range of the rotation speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view exemplarily illustrating parameters required for determining the position of a motor according to various exemplary embodiments of the present invention;

FIG. 8 is a view exemplarily illustrating N values for setting motor position determination points depending on rotation speeds of the motor;

Figure 1:
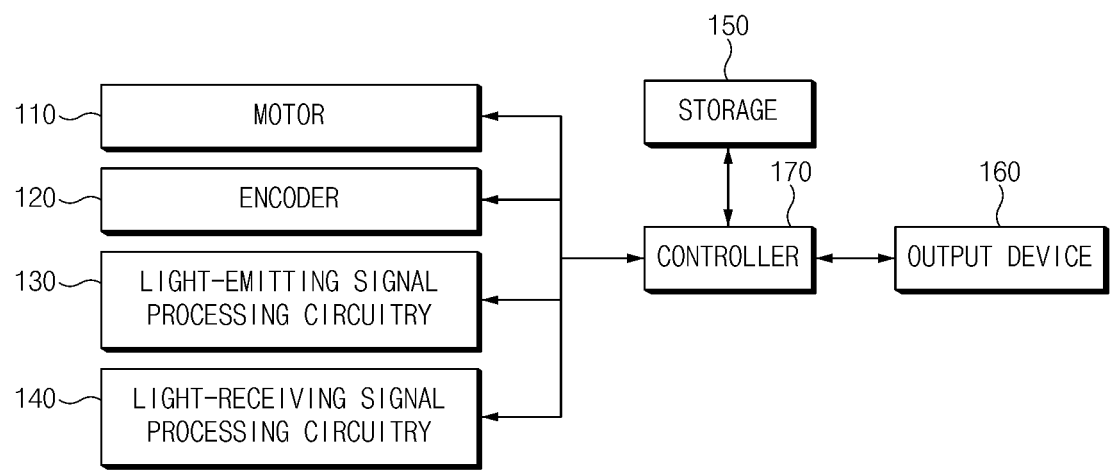
FIG. 1 is a view exemplarily illustrating a configuration of an apparatus of improving position accuracy of a LIDAR motor according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of an apparatus configured for improving position accuracy of a LIDAR motor according to various exemplary embodiments of the present invention.

As illustrated in FIG. 1, the apparatus 100 for improving the position accuracy of the LIDAR motor according to the exemplary embodiment of the present invention may include a motor 110, an encoder 120, light-emitting signal processing circuitry 130, light-receiving signal processing circuitry 140, storage 150, an output device 160, and a controller 170.

The motor 110 may rotate at a rotation speed set by a user and may rotate a mirror that reflects a laser emitted from the light-emitting signal processing circuitry 130 toward a target object. According to various exemplary embodiments of the present invention, the motor 110 may include a servo motor.

The encoder 120 may output a pulse waveform depending on the rotation of the motor 110 and may transmit the output pulse waveform to the controller 170. Here, the pulse waveform may include an incremental pulse waveform. The encoder 120 according to various exemplary embodiments of the present invention may include an incremental rotary encoder, and $2^n$ incremental pulse waveforms may be output per one revolution of the motor 110. According to various exemplary embodiments of the present invention, when n is 10, the encoder 120 may output a 1024-cycle pulse waveform per one revolution of the motor 110. A more detailed description of the encoder 120 will be provided below with reference to FIG. 2.

Figure 2:
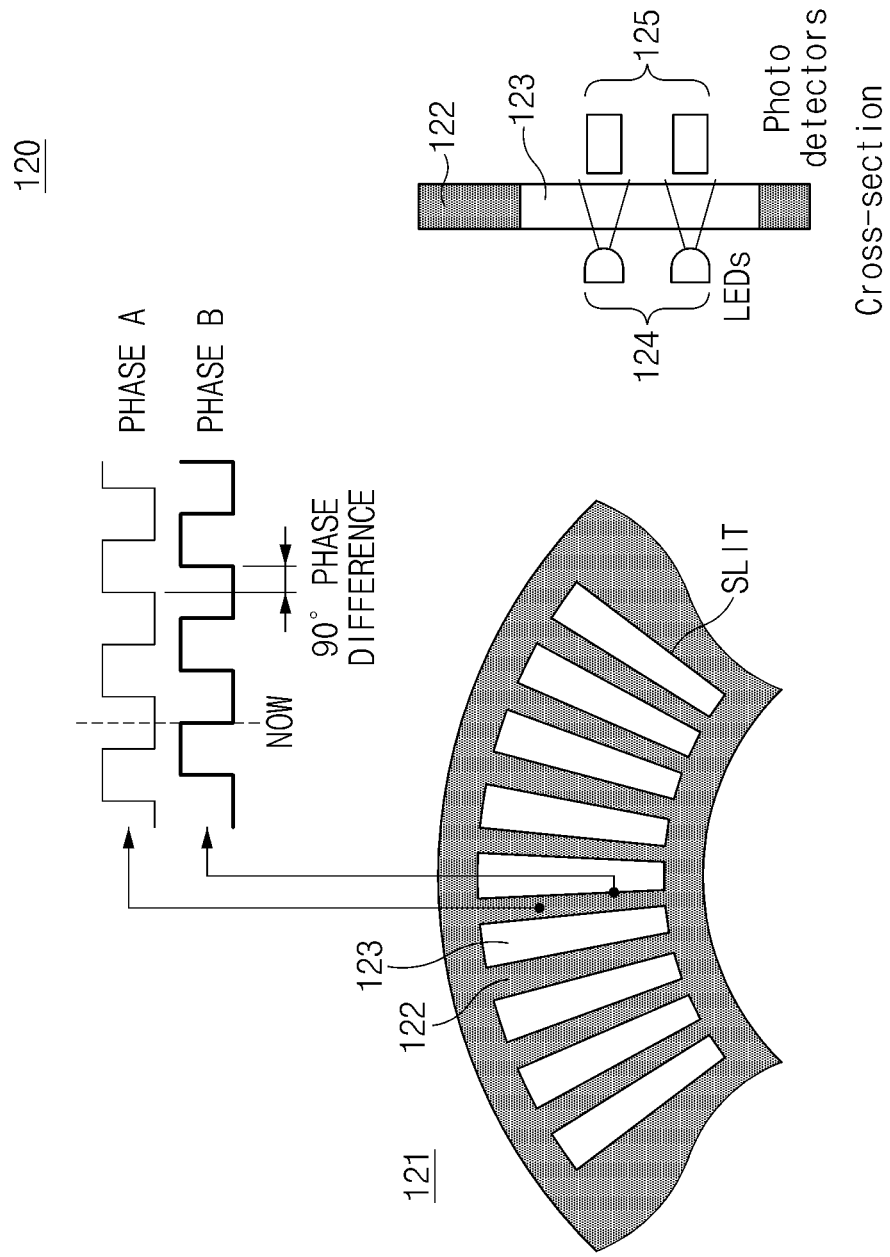
FIG. 2 is a schematic view exemplarily illustrating a rotary encoder according to various exemplary embodiments of the present invention.

FIG. 2 is a schematic view exemplarily illustrating the rotary encoder according to various exemplary embodiments of the present invention.

As illustrated in FIG. 2, the rotary encoder 120 may include a code wheel 121 having reflection sections 122 and transmission sections 123. The code wheel 121 may be integrated with the motor 110, and when the code wheel 121 is not integrated with the motor 110, the code wheel 121 may rotate depending on rotation of the motor 110. A pair of LEDs 124 may be provided behind the code wheel 121, and photo detectors 125 receiving light output from the LEDs 124 may be provided in front of the code wheel 121. As the code wheel 121 rotates, light output from the LEDs 124 is transmitted through the transmission sections 123 and blocked by the reflection sections 122, and the encoder 120 may generate a pulse waveform accordingly. The photo detectors 125 may be disposed such that pulse waveforms are 90 degrees out of phase with respect to the transmission sections 123. Accordingly, when the code wheel 121 rotates in the clockwise direction thereof, a pulse waveform having phase A may be output ahead a pulse waveform having phase B by a phase of 90 degrees.

Figure 3:
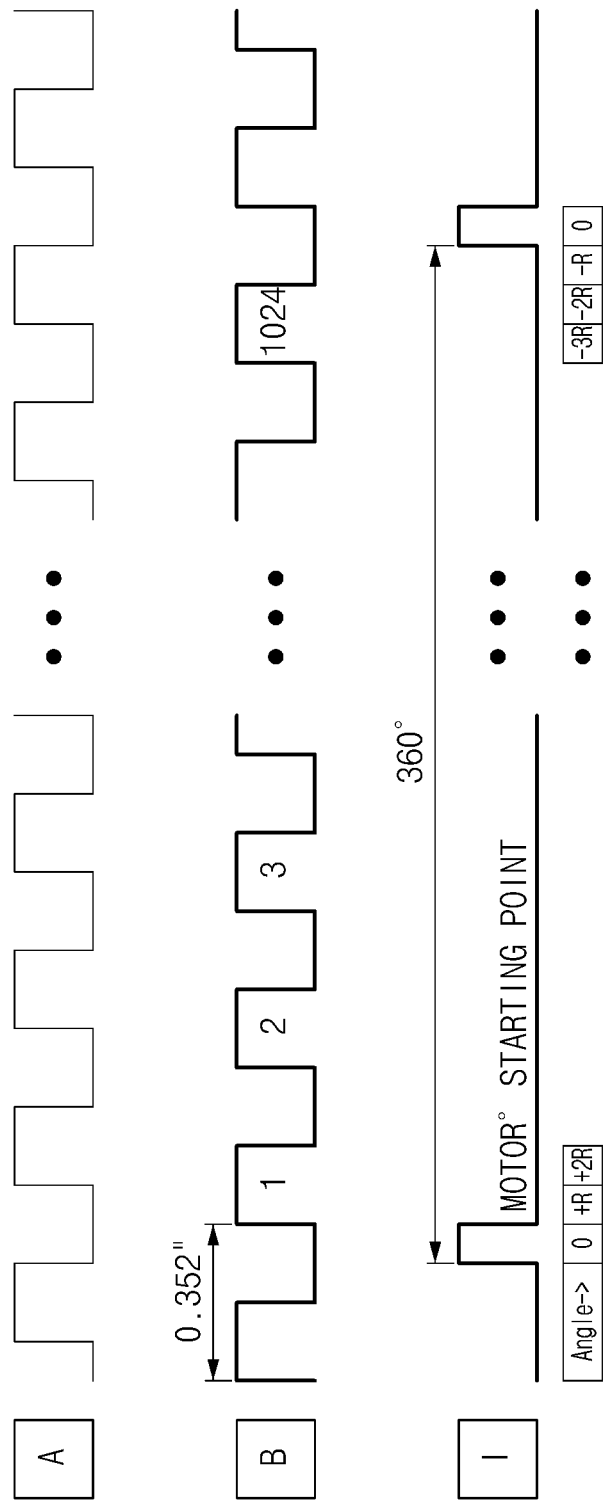
FIG. 3 is a view exemplarily illustrating pulse waveforms output from the rotary encoder according to various exemplary embodiments of the present invention.

FIG. 3 is a view exemplarily illustrating pulse waveforms output from the rotary encoder according to various exemplary embodiments of the present invention.

As illustrated in FIG. 3, the rotary encoder 120 according to the exemplary embodiment of the present invention may output $2^n$ pulse waveforms as the motor 110 makes one revolution with respect to a predetermined position. According to various exemplary embodiments of the present invention, when n is 10, the rotary encoder 120 may output a 1024-cycle pulse waveform. That is, the encoder 120 may output a 1024-cycle pulse waveform as the motor 110 rotates 360 degrees. Accordingly, one cycle of the pulse waveform may be expressed as 0.352 degrees. As the rotary encoder 120 has a higher specification, N may be increased to 11 and 12, and one cycle of a pulse waveform may be determined to be 0.176 degrees and 0.088 degrees. That is, as the encoder 120 has a higher specification, the position of the motor 110 may be more accurately determined.

The light-emitting signal processing circuitry 130 may emit a laser to the target object for each preset horizontal angle of view as the motor 110 rotates. Here, the horizontal angle of view may refer to a horizontal angle at which the target object is configured to be detected. Furthermore, the light-emitting signal processing circuitry 130 may emit a laser to the target object with horizontal angular resolutions into which the horizontal angle of view is divided. According to various exemplary embodiments of the present invention, the horizontal angular resolutions may be expressed as 0.1 degrees to 0.7 degrees.

When a laser emitted from the light-emitting signal processing circuitry 130 is reflected by the target object, the light-receiving signal processing circuitry 140 may detect the reflected laser. The controller 170 may determine the distance to the target object, based on the time that the laser emitted from the light-emitting signal processing circuitry 130 takes to return to the light-receiving signal processing circuitry 140 by being reflected by the target object.

For operation of the apparatus 100 for improving the position accuracy of the LIDAR motor according to the exemplary embodiment of the present invention, the storage 150 may store at least one algorithm for performing operation or execution of various commands. Furthermore, the storage 150 may store a parameter generated depending on the rotation speed of the motor 110 for determination of the position of the motor 110 within the preset horizontal angle of view. The storage 150 may include at least one of a flash memory, a hard disc, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disc, or an optical disc.

The output device 160 may output the distance to the target object, which is determined by the controller 170, in a three-dimensional (3D) shape. According to various exemplary embodiments of the present invention, the output device 160 may output the distance to the target object, which is determined by the controller 170, using a point cloud method.

The controller 170 may be implemented by various processing devices such as a microprocessor having a semiconductor chip embedded therein for performing operation or execution of various commands and may control overall operation of the apparatus 100 for improving the position accuracy of the LIDAR motor according to the exemplary embodiment of the present invention. The controller 170 may generate a parameter depending on the rotation speed of the motor 110 for determination of the position of the motor 110 within the preset horizontal angle of view and may determine whether the motor 110 is in a normal operation state and the position of the motor 110, based on the parameter. A more detailed description of operation of the controller 170 will be provided below with reference to FIG. 4, FIG. 5, FIG. 6, FIG. 7, FIG. 8, and FIG. 9.

FIG. 4 is a view exemplarily illustrating parameters required for determining the position of the motor according to various exemplary embodiments of the present invention. The parameters according to the exemplary embodiment of the present invention may be set depending on rotation speeds of the motor 110 and therefore may be classified depending on frame rates and RPMs that represent the rotation speeds of the motor 110. The frame rates may mean revolutions per second (Hz) of the motor 110, and the RPMs may mean revolutions per minute of the motor 110.

When a laser is emitted at a preset horizontal angle of view (e.g., 120 degrees) to detect a target object according to various exemplary embodiments of the present invention, the controller 170 may generate a parameter by converting a horizontal angular resolution previously defined depending on a rotation speed (a frame rate) of the motor 110 into time, determining rotation time per one revolution of the motor 110 depending on the rotation speed of the motor 110, and determining a rotation angle of the motor 110 per one cycle of a pulse waveform and rotation time of the motor 110 per one cycle of the pulse waveform, based on the number of cycles of the pulse waveform output per one revolution of the motor 110 depending on the rotation speed of the motor 110.

For example, when the motor 110 rotates at a frame rate of 25 Hz (1500 RPM), the controller 170 may determine the rotation time per one revolution of the motor 110 as 0.04 seconds. Furthermore, when the frame rate of the motor 110 is 25 Hz, the controller 170 may obtain, from the storage 150, a horizontal angular resolution of 0.23 degrees previously defined depending on the frame rate and may determine the rotation time as 13 μs (microseconds) by converting the horizontal angular resolution of 0.23 degrees into time. Furthermore, according, according to various exemplary embodiments of the present invention, when the number of cycles of a pulse waveform output per one revolution of the motor 110 is 1024, the controller 170 may determine the rotation angle of the motor 110 per one cycle of the pulse waveform as 0.352 degrees and may determine the rotation time of the motor 110 per one cycle of the pulse waveform as 39.1 μs (microseconds).

According to various exemplary embodiments of the present invention, when the rotation speed of the motor 110 is 1200 RPM, 900 RPM, 600 RPM, and 500 RPM, the controller 170 may obtain parameters determined by the above-described method, and the parameters classified depending on the rotation speeds may be stored as a map in the storage 150.

When the rotation speed of the motor 110 stored in the storage 150 is set by a user, the controller 170 may automatically set a parameter stored to correspond to the rotation speed of the motor 110 and may determine whether the motor 110 is in a normal operation state and the position of the motor 110, based on the automatically set parameter.

However, when a new rotation speed other than the rotation speed of the motor 110 stored in the storage 150 is set by the user, the controller 170 may determine a parameter corresponding to the new rotation speed again. For example, when the rotation speed of the motor 110 is set to 1400 RPM and the horizontal angular resolution corresponding to the rotation speed is 0.115 degrees, the controller 170 may determine the rotation time per one revolution of the motor 110 as 0.0429 seconds and may determine the rotation time as 13.7 μs (microseconds) by converting the horizontal angular resolution of 0.115 degrees into time. Furthermore, when the number of cycles of a pulse waveform output per one revolution of the motor 110 is 1024, the controller 170 may determine the rotation angle of the motor 110 per one cycle of the pulse waveform as 0.352 degrees and may determine the rotation time of the motor 110 per one cycle of the pulse waveform as 41.9 μs (microseconds). The controller 170 may store, in the storage 150, the determined parameter corresponding to the new rotation speed.

The controller 170 may determine whether the motor 110 is in a normal operation state, based on a pulse waveform output when the motor 110 rotates. A more detailed description thereabout will be provided below with reference to FIG. 5.

Figure 5:
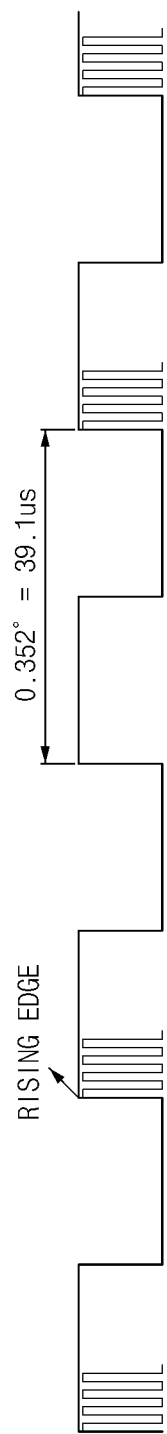
FIG. 5 is a view exemplarily illustrating an output waveform of the encoder for determining normal operation of the motor according to various exemplary embodiments of the present invention.

FIG. 5 is a view exemplarily illustrating an output waveform of the encoder for determining normal operation of the motor according to various exemplary embodiments of the present invention.

As illustrated in FIG. 5, the controller 170 may determine whether the motor 110 is normal, by setting an allowable error range of the rotation speed of the motor 110, re-determining a rotation time range of the motor 110 per one cycle of a pulse waveform within the allowable error range, and counting clock signals of a preset processing speed (e.g., 100 MHz) within the re-determined rotation time range. For example, the controller 170 may set the allowable error range of the rotation speed of the motor 110 to up to ±2%, and a frame rate may be allowed to have an error of ±30 RPM with respect to 25 Hz, that is, 1500 RPM.

When the rotation speed of the motor 110 is 1500 RPM, the controller 170 may determine the rotation time per one cycle of the pulse waveform as 39.1 μs. The controller 170 may count clock signals of a preset processing speed (e.g., 100 MHz) within a one-cycle pulse waveform, and when the total clock-signal count is 3910, the controller 170 may determine that the motor 110 is in a constant speed operation state. When the motor 110 is in the constant speed operation state, the controller 170 may determine that the motor 110 is in a normal operation state.

When the allowable error range of the rotation speed of the motor 110 is set to ±2% and the motor 110 rotates at 1470 RPM to 1530 RPM, the controller 170 may determine the rotation time per one cycle of the pulse waveform as 38.32 μs to 39.89 μs. The controller 170 may count clock signals of a preset processing speed (e.g., 100 MHz) from a rising edge within a one-cycle pulse waveform, and when the total clock-signal count ranges from 3832 to 3989, the controller 170 may determine that the motor 110 rotates within the allowable error range and may determine that the motor 110 is in a normal operation state.

Meanwhile, when the total clock-signal count is outside the range of 3832 to 3989, the controller 170 may determine that the motor 110 rotates outside the allowable error range and may determine that the motor 110 is in an abnormal operation state. When it is determined that the motor 110 is in the abnormal operation state, the controller 170 may generate a signal to request diagnosis of the LIDAR.

When the motor 110 is in the normal operation state, the controller 170 may determine the position of the motor 110. A more detailed description thereabout will be provided below with reference to FIG. 6 and FIG. 7.

Figure 6:
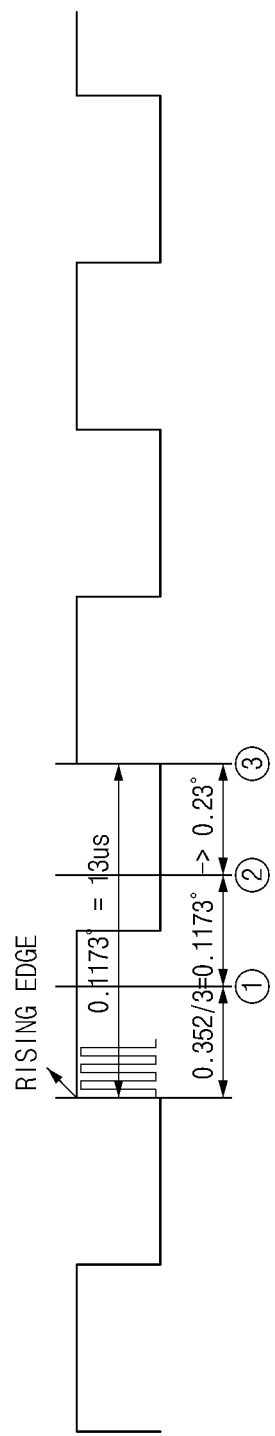
FIG. 6 and FIG. 7 are schematic views exemplarily illustrating a method for determining the position of the motor according to various exemplary embodiments of the present invention.
Figure 7:
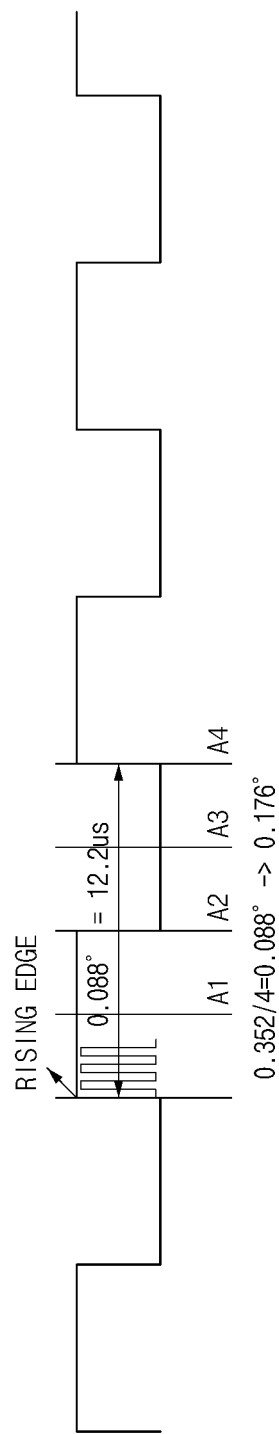

FIG. 6 and FIG. 7 are schematic views exemplarily illustrating a method for determining the position of the motor according to various exemplary embodiments of the present invention.

When the motor 110 is in a normal operation state, the controller 170 may divide the rotation angle of the motor 110 per one cycle of a pulse waveform output depending on rotation of the motor 110 by N value and may determine the position of the motor 110 at points obtained by dividing the rotation angle of the motor 110 per one cycle of the pulse waveform by N.

According to various exemplary embodiments of the present invention, as illustrated in FIG. 6, when a 1024-cycle pulse waveform is output per one revolution of the motor 110, the controller 170 may determine the rotation angle of the motor 110 per one cycle of the pulse waveform as 0.352 degrees. When the motor 110 rotates at 1500 RPM, the controller 170 may set N to 3, may divide 0.352 by 3, and may determine the position of the motor 110 at three points (e.g., a first point ①, a second point ②, and a third point ③) in one cycle of the pulse waveform.

The controller 170 may start to count clock signals of a preset processing speed (e.g., 100 MHz) from a rising edge point of one cycle of the pulse waveform, may determine the total clock-signal count at the first point ①, the total clock-signal count at the second point ②, and the total clock-signal count at the third point ③, and may determine the position of the motor 110 at the points, based on the total clock-signal counts determined at the three points ①, ②, and ③. That is, the controller 170 may determine whether the motor 110 rotates to the points, based on the total clock-signal counts.

According to various exemplary embodiments of the present invention, the controller 170 may determine the rotation time from the rising edge point to the first point ① as about 13 μs, may determine the rotation time from the first point ① to the second point ② as about 13 μs, and may determine the rotation time from the second point ② to the third point ③ as about 13 μs. The controller 170 may count clock signals of a preset processing speed (e.g., 100 MHz) from the rising edge point, and when the total clock-signal count after about 13 μs elapses is about 1300, the controller 170 may detect that the motor 110 rotates to the first point. The controller 170 may determine whether the motor 110 rotates to the second point ② and the third point ③, by use of the above-described method.

When the motor 110 rotates 0.1173 degrees with respect to a predetermined position and the light-emitting signal processing circuitry 130 emits a laser, the controller 170 may obtain an effect of emitting a laser while rotating the motor 110 by 0.23 degrees, by beam steering (the principle of angle of incidence and angle of reflection) of the mirror. Accordingly, the horizontal angular resolution (0.23 degrees) defined depending on the rotation speed (1500 RPM) of the motor 110 may be achieved.

To provide an effect of emitting a laser to a target object at a preset angle of view (e.g., 120 degrees), the controller 170 may rotate the motor 110 by 60 degrees and may determine the position of the motor 110 at 512 points spaced from each other by 0.1173 degrees while rotating the motor 110 by 60 degrees. When determining the position of the motor 110 at 512 points, the controller 170 may use 171 pulse waveforms.

According to another exemplary embodiment of the present invention, as illustrated in FIG. 7, when a 1024-cycle pulse waveform is output per one revolution of the motor 110, the controller 170 may determine the rotation angle of the motor 110 per one cycle of the pulse waveform as 0.352 degrees. When the motor 110 rotates at 1200 RPM, the controller 170 may set N to 4, may divide 0.352 by 4, and may determine the position of the motor 110 at four points (e.g., a first point A1, a second point A2, a third point A3, and a fourth point A4) in one cycle of the pulse waveform.

The controller 170 may start to count clock signals of a preset processing speed (e.g., 100 MHz) from a rising edge point of one cycle of the pulse waveform, may determine the total clock-signal count at the first point A1, the total clock-signal count at the second point A2, the total clock-signal count at the third point A3, and the total clock-signal count at the fourth point A4, and may determine the position of the motor 110 at the points, based on the total clock-signal counts determined at the points A1, A2, A3, and A4. That is, the controller 170 may determine whether the motor 110 rotates to the points, based on the total clock-signal counts.

According to various exemplary embodiments of the present invention, the controller 170 may determine the rotation time from the rising edge point to the first point A1 as about 12.2 μs, may determine the rotation time from the first point A1 to the second point A2 as about 12.2 μs, may determine the rotation time from the second point A2 to the third point A3 as about 12.2 μs, and may determine the rotation time from the third point A3 to the fourth point A4 as about 12.2 μs. The controller 170 may count clock signals of a preset processing speed (e.g., 100 MHz) from the rising edge point, and when the total clock-signal count after about 12.2 μs elapses is about 1220, the controller 170 may detect that the motor 110 rotates to the first point A1. The controller 170 may determine whether the motor 110 rotates to the second point A2, the third point A3, and the fourth point A4, by use of the above-described method.

When the motor 110 rotates 0.088 degrees with respect to a predetermined position and the light-emitting signal processing circuitry 130 emits a laser, the controller 170 may obtain an effect of emitting a laser while rotating the motor 110 by 0.17 degrees, by beam steering (the principle of angle of incidence and angle of reflection) of the mirror. Accordingly, the horizontal angular resolution (0.17 degrees) defined depending on the rotation speed (1200 RPM) of the motor 110 may be achieved.

The controller 170 may set N depending on the rotation speed of the motor 110 by use of the above-described method. A more detailed description thereabout will be provided below with reference to FIG. 8.

FIG. 8 is a view exemplarily illustrating N values for setting motor position determination points depending on rotation speeds of the motor.

As illustrated in FIG. 8, the controller 170 may set N points for determining the position of the motor 110, based on the N value set depending on the rotation speed of the motor 110 and may detect the position of the motor 110 at the N points. According to various exemplary embodiments of the present invention, when the rotation speed of the motor 110 is 900 RPM, the controller 170 may set N to 5 and may determine the position of the motor 110 at five points obtained by dividing the rotation angle of the motor 110 per one cycle of a pulse waveform by 5. Furthermore, when the rotation speed of the motor 110 is 600 RPM, the controller 170 may set N to 6 and may determine the position of the motor 110 at six points obtained by dividing the rotation angle of the motor 110 per one cycle of the pulse waveform by 6. Moreover, when the rotation speed of the motor 110 is 300 RPM, the controller 170 may set N to 7 and may determine the position of the motor 110 at seven points obtained by dividing the rotation angle of the motor 110 per one cycle of the pulse waveform by 7.

When an error in the position of the motor 110 occurs due to an allowable error range of the rotation speed of the motor 110, the controller 170 may compensate for the motor position error by initializing the total clock-signal count at a rising edge of a pulse waveform. A more detailed description thereabout will be provided below with reference to FIG. 9.

Figure 9:
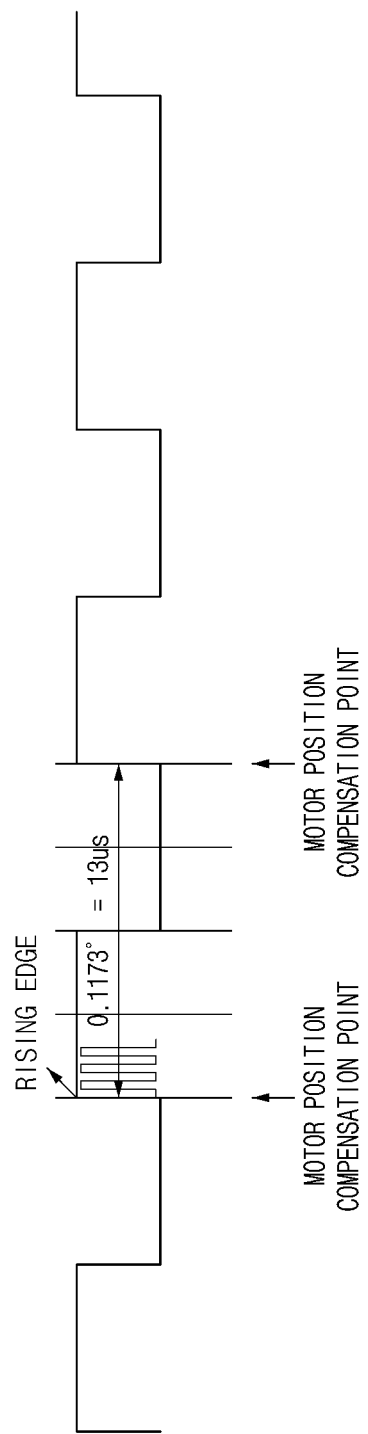
FIG. 9 is a schematic view exemplarily illustrating a motor position compensation method according to various exemplary embodiments of the present invention.

FIG. 9 is a schematic view exemplarily illustrating a motor position compensation method according to various exemplary embodiments of the present invention.

When the rotation speed of the motor 110 is 1500 RPM and an allowable error range is set to ±2%, an error of ±30 RPM may be allowed for the rotation speed, and ±0.8 μs may be allowed for the rotation time of the motor 110 per one cycle of a pulse waveform. Accordingly, the rotation time of 38.32 μs to 39.89 μs may be allowed. The controller 170 may determine an error angle of the position of the motor 110 by use of Equation 1.

Error Angle of Motor Position=±Er_time/Mt_time*360 degrees     <Equation 1>

(Er_time: an allowable error of the rotation time of the motor per one cycle of a pulse waveform)

(Mt_time: the rotation time per one revolution of the motor)

According to various exemplary embodiments of the present invention, when Er_time is ±0.8 μs and Mt_time is 0.04 s, the controller 170 may determine the error angle of the position of the motor 110 as ±0.0072 degrees. That is, as illustrated in FIG. 9, when there is an error of ±2% in the rotation speed of the motor 110, the controller 170 may determine that there is an error of 0.0072 degrees in motor positions determined at three points obtained by dividing the rotation angle of the motor 110 per one cycle of a pulse waveform by 3.

According to various exemplary embodiments of the present invention, when an error in the position of the motor 110 occurs at each point, the controller 170 may compensate for the position of the motor 110 by initializing, at a rising edge in the next cycle, the total clock-signal count determined in the previous cycle of a pulse waveform.

By use of a PWM pulse waveform and UVW pulse waveforms other than the incremental pulse waveform output from the encoder 120, the controller 170 may determine whether the motor 110 normally operates, may determine the position of the motor 110, and when there is an error in the position of the motor 110, may compensate for the error in the position of the motor 110. A more detailed description thereabout will be provided below with reference to FIG. 10, and FIG. 11.

Figure 10:
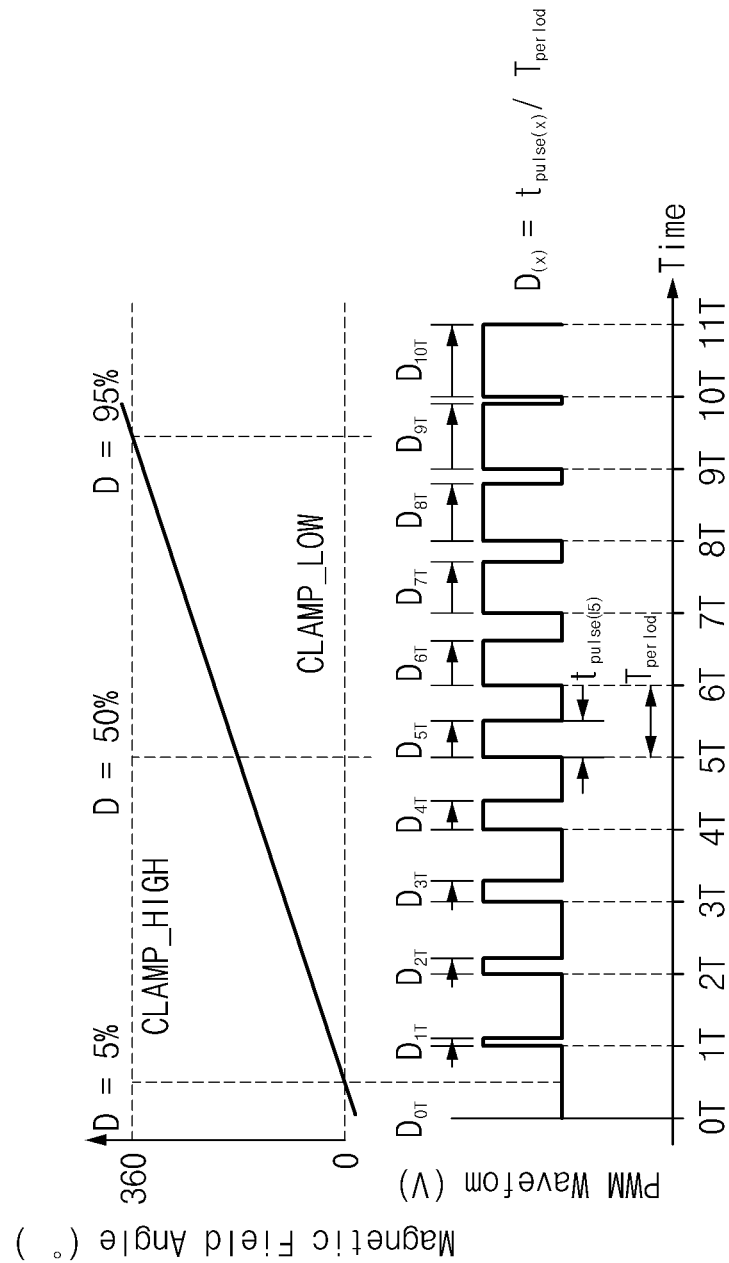
FIG. 10 is a view exemplarily illustrating a PWM pulse waveform output according to various exemplary embodiments of the present invention.
Figure 11:
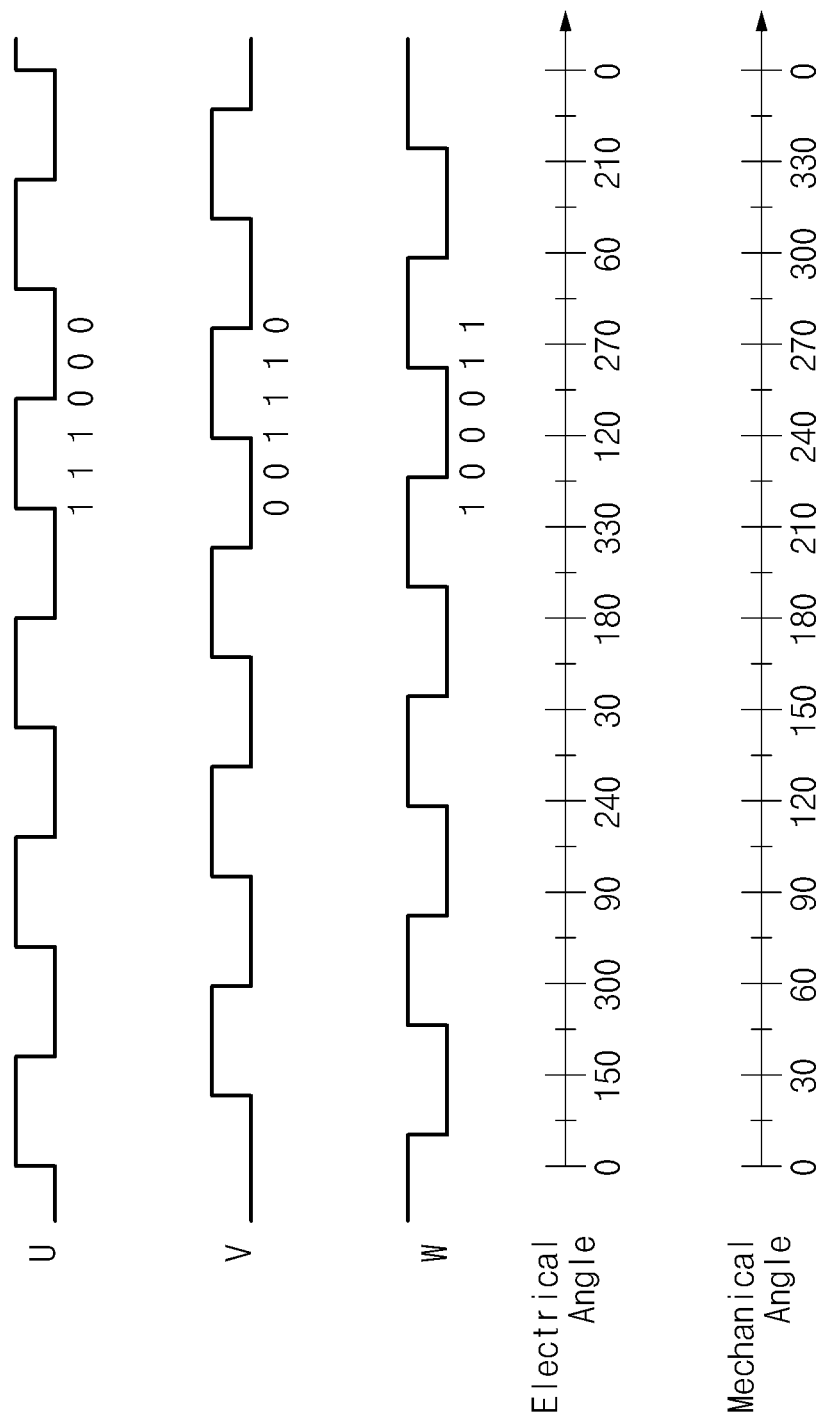
FIG. 11 is a view exemplarily illustrating U, V, and W pulse waveforms output according to various exemplary embodiments of the present invention.

FIG. 10 is a view exemplarily illustrating a PWM pulse waveform output according to various exemplary embodiments of the present invention, and FIG. 11 is a view exemplarily illustrating U, V, and W pulse waveforms output according to various exemplary embodiments of the present invention.

As illustrated in FIG. 10, and FIG. 11, the controller 170 may determine the position of the motor 110 by determining the rotation angle and the rotation time of the motor 110 depending on the duty ratio of the PWM pulse waveform and determining the rotation angle and the rotation time of the motor 110 depending on pulses of signals of the U, V, and W pulse waveforms (e.g., U: High, V: Low, and W: High).

Figure 12:
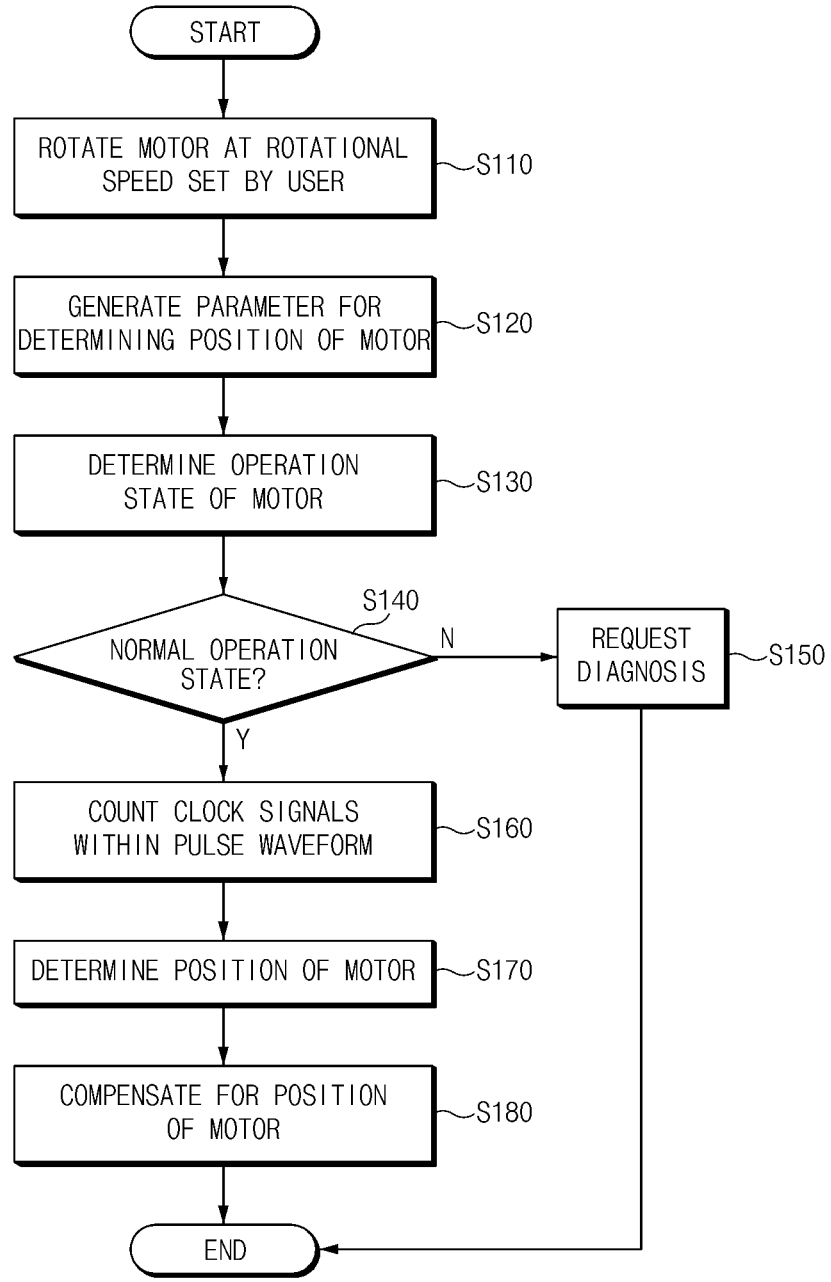
FIG. 12 is a flowchart illustrating a method for improving position accuracy of a LIDAR motor according to various exemplary embodiments of the present invention.

FIG. 12 is a flowchart illustrating a method for improving position accuracy of a LIDAR motor according to various exemplary embodiments of the present invention.

As illustrated in FIG. 12, the controller 170 may rotate the motor 110 at a rotation speed set by a user (S110). When the motor 110 is rotated at the rotation speed set by the user, the controller 170 may determine whether the motor 110 is in a normal operation state and may generate a parameter for determining the position of the motor 110 (S120). In S120, the controller 170 may generate the parameter by obtaining a horizontal angular resolution previously defined depending on the rotation speed of the motor 110 from the storage 150, converting the horizontal angular resolution into time based on the rotation speed of the motor 110, determining rotation time per one revolution of the motor 110 depending on the rotation speed of the motor 110, and determining a rotation angle of the motor 110 per one cycle of a pulse waveform and rotation time of the motor 110 per one cycle of the pulse waveform, based on the number of cycles of the pulse waveform output per one revolution of the motor 110 depending on the rotation speed of the motor 110.

The controller 170 may determine an operation state of the motor 110 based on the parameter generated in S120 (S130). In S130, the controller 170 may determine an operation state of the motor 110 based on the pulse waveform output when the motor 110 rotates. The controller 170 may determine whether the motor 110 is normal, by setting an allowable error range of the rotation speed of the motor 110, re-determining a rotation time range of the motor 110 per one cycle of the pulse waveform within the allowable error range, and counting clock signals of a preset processing speed (e.g., 100 MHz) within the re-determined rotation time range. For example, the controller 170 may set the allowable error range of the rotation speed of the motor 110 to up to ±2%, and a frame rate may be allowed to have an error of ±30 RPM with respect to 25 Hz, that is, 1500 RPM.

When the rotation speed of the motor 110 is 1500 RPM, the controller 170 may determine the rotation time per one cycle of the pulse waveform as 39.1 μs. The controller 170 may count clock signals of a preset processing speed (e.g., 100 MHz) within a one-cycle pulse waveform, and when the total clock-signal count is 3910, the controller 170 may determine that the motor 110 is in a constant speed operation state.

Furthermore, when the allowable error range of the rotation speed of the motor 110 is set to ±2% and the motor 110 rotates at 1470 RPM to 1530 RPM, the controller 170 may determine the rotation time per one cycle of the pulse waveform as 38.32 μs to 39.89 μs. The controller 170 may count clock signals of a preset processing speed (e.g., 100 MHz) from a rising edge within a one-cycle pulse waveform, and when the total clock-signal count ranges from 3832 to 3989, the controller 170 may determine that the motor 110 rotates within the allowable error range.

The controller 170 may determine whether the operation state of the motor 110 is a normal operation state (S140). In S140, the controller 170 may determine that the motor 110 is in a normal operation state, when it is determined that the operation state of the motor 110 determined in S130 is a constant speed operation state or the motor 110 rotates within the allowable error range (Y).

Meanwhile, the controller 170 may determine that the motor 110 is in an abnormal operation state, when it is determined that the operation state of the motor 110 determined in S130 is not a constant speed operation state or the motor 110 rotates outside the allowable error range (N). When it is determined that the motor 110 is in the abnormal operation state, the controller 170 may generate a signal to request diagnosis of the LIDAR (S150).

When it is determined that the operation state of the motor 110 is a normal operation state, the controller 170 may count clock signals of a preset processing speed (e.g., 100 MHz) from a rising edge point of the pulse waveform output depending on the rotation of the motor 110 (S160). In S160, the controller 170 may divide the rotation angle of the motor 110 per one cycle of the pulse waveform by N value and may count clock signals at points obtained by dividing the rotation angle of the motor 110 per one cycle of the pulse waveform by N.

Furthermore, the controller 170 may determine the position of the motor 110 at each of the points, based on the total clock-signal count at the point (S170). In S170, the controller 170 may determine whether the motor 110 rotates to the points, based on the total clock-signal counts.

When an error in the position of the motor 110 occurs due to the allowable error range of the rotation speed of the motor 110, the controller 170 may compensate for the motor position error by initializing the total clock-signal count at the rising edge of the pulse waveform (S180).

Figure 13:
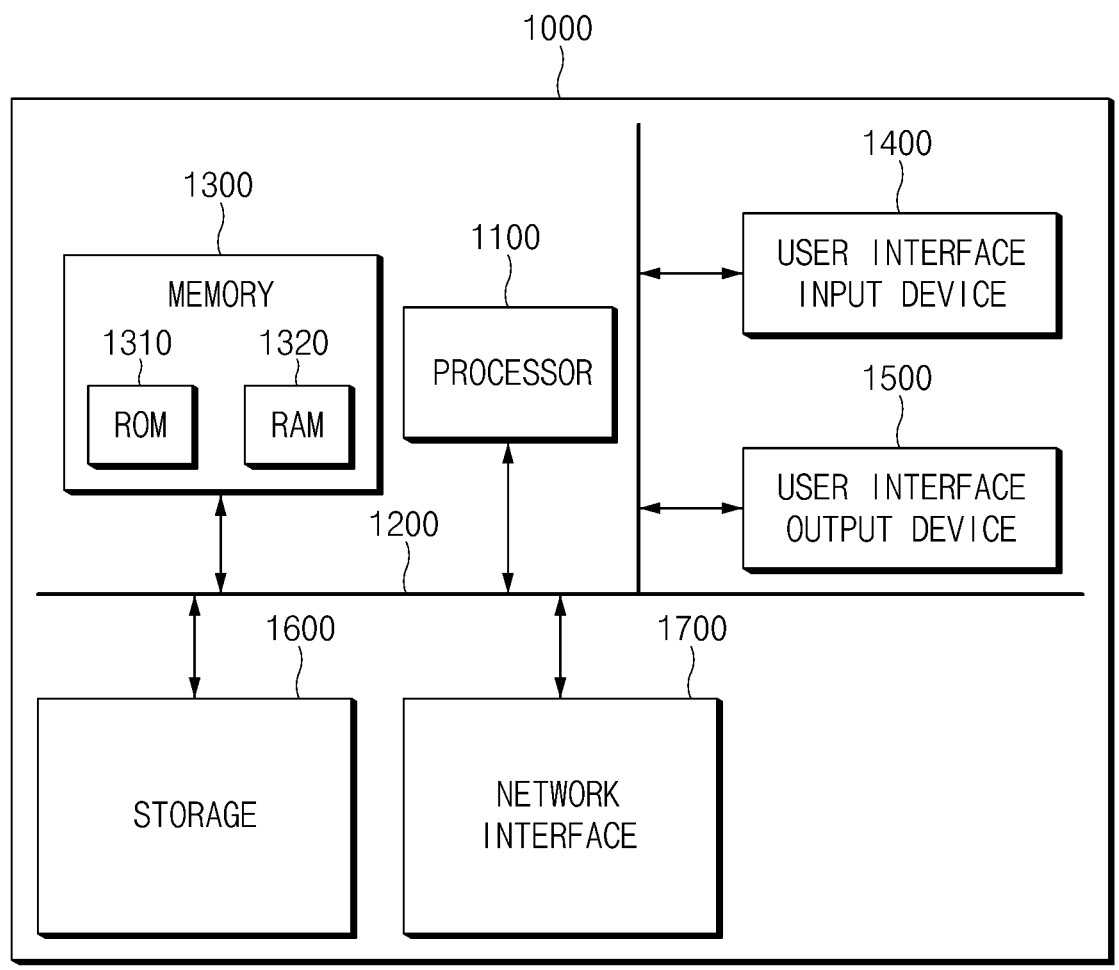
FIG. 13 is a view exemplarily illustrating a configuration of a determining system for executing a method according to various exemplary embodiments of the present invention.

FIG. 13 is a view exemplarily illustrating a configuration of a determining system for executing a method according to various exemplary embodiments of the present invention.

Referring to FIG. 13, the determining system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for improving the position accuracy of the LIDAR motor according to the exemplary embodiments of the present invention may determine the position of the motor in units of horizontal angular resolutions and when an error occurs, may compensate for the error, improving the accuracy in detecting a target object.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of improving position accuracy of a Light Detection and Ranging (LIDAR) motor, the apparatus comprising:
   a motor configured to rotate at a rotation speed set by a user; and
   a controller configured to generate a parameter depending on the rotation speed for determining a position of the motor within a preset horizontal angle of view and to determine whether the motor is in a normal operation state and the position of the motor, based on the parameter.

2. The apparatus of claim 1, further including:
   an encoder configured to output a pulse waveform depending on the rotation of the motor with respect to a predetermined position of the motor.

3. The apparatus of claim 2, wherein the controller is configured to generate the parameter by obtaining a horizontal angular resolution previously defined depending on the rotation speed, converting the horizontal angular resolution into time based on the rotation speed, determining rotation time per one revolution of the motor depending on the rotation speed, and determining a rotation angle of the motor per one cycle of a pulse waveform and rotation time of the motor per one cycle of the pulse waveform, based on a number of cycles of the pulse waveform output per one revolution of the motor depending on the rotation speed.

4. The apparatus of claim 3, wherein the controller is configured to determine whether the motor is in the normal operation state, by setting an allowable error range of the rotation speed, re-determining a rotation time range of the motor per one cycle of the pulse waveform within the allowable error range, and counting clock signals of a preset processing speed within the re-determined rotation time range.

5. The apparatus of claim 4, wherein the controller is configured to divide the rotation angle of the motor per one cycle of the pulse waveform by N value and to determine the position of the motor at each of points obtained by dividing the rotation angle of the motor per one cycle of the pulse waveform by the N value.

6. The apparatus of claim 5, wherein the controller is configured to set the N value depending on the rotation speed.

7. The apparatus of claim 5, wherein the controller is configured to start to count the clock signals of the preset processing speed from a rising edge point of the pulse waveform, to determine a total clock-signal count at each of the points obtained by dividing the rotation angle of the motor per one cycle of the pulse waveform by the N value, and to determine whether the motor rotates to the point, based on the total clock-signal count determined at the point.

8. The apparatus of claim 7, wherein the controller is configured to compensate for an error in the position of the motor by initializing the total clock-signal count at the rising edge point of the pulse waveform, when the error in the position of the motor occurs due to the allowable error range of the rotation speed.

9. The apparatus of claim 4, wherein the controller is configured to generate a signal to request diagnosis of the LIDAR, when the motor is not in the normal operation state.

10. The apparatus of claim 9, wherein the controller is configured to conclude that the motor is not in the normal operation state, when an operation state of the motor is not a constant speed operation state or the motor rotates outside the allowable error range.

11. A method for improving position accuracy of a Light Detection and Ranging (LIDAR) motor, the method including:
   rotating a motor at a rotation speed set by a user;
   generating, by a controller, a parameter depending on the rotation speed for determining a position of the motor within a preset horizontal angle of view;
   determining, by the controller, whether the motor is in a normal operation state, based on the parameter; and
   determining, by the controller, the position of the motor, based on the parameter.

12. The method of claim 11, wherein an encoder outputs a pulse waveform depending on the rotation of the motor with respect to a predetermined position of the motor.

13. The method of claim 12, wherein the generating of the parameter includes:
   generating, by the controller, the parameter by obtaining a horizontal angular resolution previously defined depending on the rotation speed, converting the horizontal angular resolution into time based on the rotation speed, determining rotation time per one revolution of the motor depending on the rotation speed, and determining a rotation angle of the motor per one cycle of a pulse waveform and rotation time of the motor per one cycle of the pulse waveform, based on a number of cycles of the pulse waveform output per one revolution of the motor depending on the rotation speed.

14. The method of claim 13, wherein the determining of whether the motor is in the normal operation state includes:
   determining whether the motor is in the normal operation state, by setting an allowable error range of the rotation speed, re-determining a rotation time range of the motor per one cycle of the pulse waveform within the allowable error range, and counting clock signals of a preset processing speed within the re-determined rotation time range.

15. The method of claim 14, wherein the determining of the position of the motor includes:
   dividing the rotation angle of the motor per one cycle of the pulse waveform by N value and determining the position of the motor at each of points obtained by dividing the rotation angle of the motor per one cycle of the pulse waveform by the N value.

16. The method of claim 15, wherein the N value is set depending on the rotation speed.

17. The method of claim 15, wherein the determining of the position of the motor includes:
   starting to count the clock signals of the preset processing speed from a rising edge point of the pulse waveform, determining a total clock-signal count at each of the points obtained by dividing the rotation angle of the motor per one cycle of the pulse waveform by the N value, and determining whether the motor rotates to the point, based on the total clock-signal count determined at the point.

18. The method of claim 17, further including:
   compensating, by the controller, for an error in the position of the motor by initializing the total clock-signal count at the rising edge point of the pulse waveform, when the error in the position of the motor occurs due to the allowable error range of the rotation speed.

19. The method of claim 14, wherein the determining of whether the motor is in the normal operation state further includes:
   when the motor is not in the normal operation state, generating, by the controller, a signal to request diagnosis of the LIDAR.

20. The method of claim 19, wherein the controller is configured to conclude that the motor is not in the normal operation state, when an operation state of the motor is not a constant speed operation state or the motor rotates outside the allowable error range.

* * * * *